B. H. CALKIN.
ART OF BREWING COFFEE.
APPLICATION FILED DEC. 23, 1920.
1,370,782.  Patented Mar. 8, 1921.
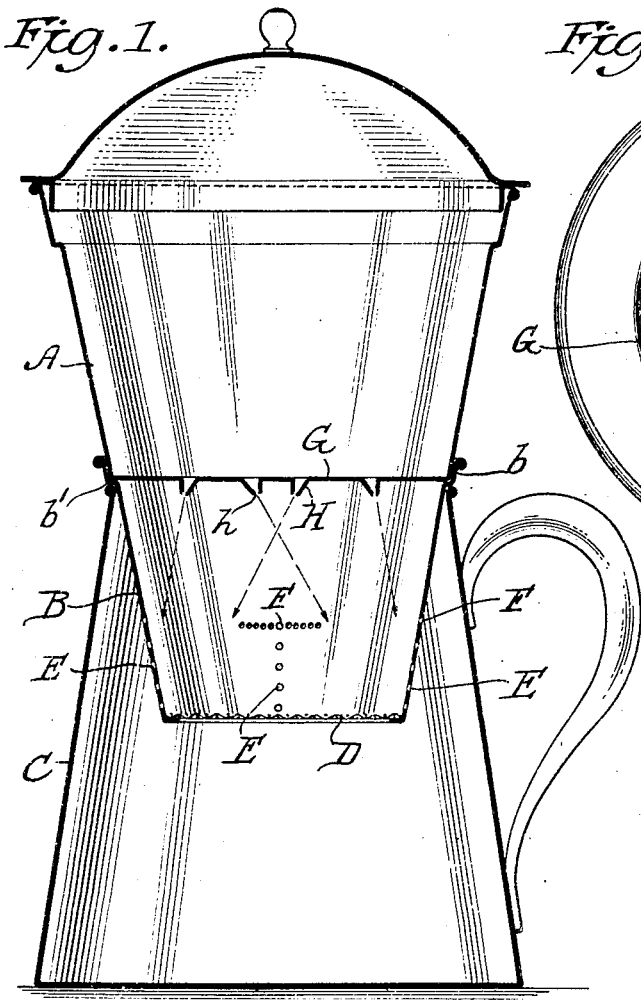
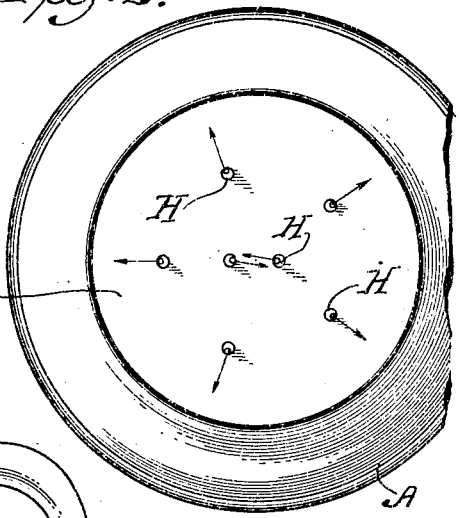
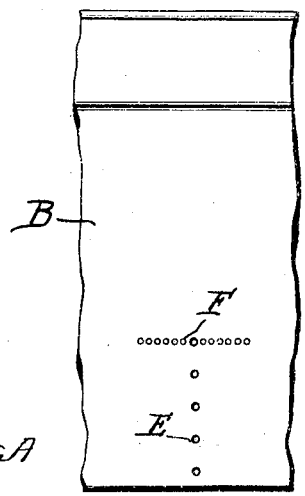
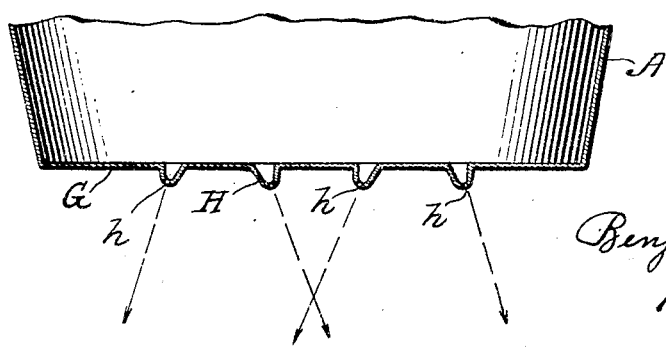
INVENTOR
Benjamin H. Calkin
BY
ATTORNEY

UNITED STATES PATENT OFFICE.

BENJAMIN H. CALKIN, OF DETROIT, MICHIGAN, ASSIGNOR TO FRANCES L. CALKIN, OF DETROIT, MICHIGAN.

ART OF BREWING COFFEE.

1,370,782.  Specification of Letters Patent.  Patented Mar. 8, 1921.

Application filed December 23, 1920. Serial No. 432,640.

*To all whom it may concern:*

Be it known that I, BENJAMIN H. CALKIN, a subject of the King of Great Britain, residing at Detroit, county of Wayne, and State of Michigan, have invented a certain new and useful Art of Brewing Coffee, of which the following is a specification.

This invention pertains to the art of brewing coffee, involving both the process and an apparatus whereby a desirable beverage may be prepared expeditiously; but in the practical form of the apparatus herein disclosed, the invention is a household or culinary article adapted to coöperate with any coffee pot for the purpose of breweing coffee in a perfect manner.

In the present invention, the objects to be attained are two-fold, generally speaking; first, to brew a single cup of coffee extract, or several cups, quickly and with equal perfection, and, second, to produce a palatable and digestible beverage containing the desirable elements of the coffee berry in proper proportions and free from the taint of the woody fiber composing in large part the coffee berry, the beverage resulting from the use of my device being of a character termed by me a "balanced" extract for want of a more comprehensive and appropriate descriptive appellation.

Now, with refernce to the term "balanced" coffee extract, experience for many years in the handling and sale of coffee, both green and roasted, and in the brewing of extracts, has demonstrated that difficulty is always encountered in the production of an extract meeting all requirements.

The fats and oils of coffee, and the coffeole, which impart the aroma and aperient quality to the beverage, are quickly extracted by bringing boiling water (water at or about 212° F.) into contact with the roasted and ground berry, but are quickly volatilized and lost.

The caffein is, also, quickly extracted and becomes a valuable principle of coffee, unless it is permitted to combine chemically with tannin and form what is known as coffee tannic acid, the latter element constituting an agent of a detrimental nature in so far as concerns its action upon the human system.

The tannin in the coffee berry is of slow extraction, accomplished best by soaking the ground coffee in water, and is also a valuable property in coffee provided it can be kept in a free condition and in a well known proportion.

Accordingly, the problem has been to devise a means and a procedure wherein the aperient oils and fats, including the caffein and the astringent tannin will be extracted from the roasted berry in the proportions and free from chemical formations so as to produce the desired palatable and digestible beverage.

The new inventive idea involved herein is the control in the flow of hot water into contact with the roasted and ground coffee berry, and in a practical form of my invention, it embodies a water container and a coffee container positioned in operative relation to each other, with the outlets in the water container of such size or proportions that the water trickles or flows at relatively slow speed into direct contact with the ground berry present in the coffee container, whereby in the brewing of the coffee extract the hot water first admitted into contact with the coffee berry carries off the fats, oils and caffein susceptible of quick extraction, and thereafter the water admitted subsequently, and for an appreciable length of time, operates to saturate the mass of ground berry and to percolate slowly through said mass for the purpose of extracting the tannin and other ingredients of a slow extractive nature, the two liquids, so to speak, being combined and constituting a beverage possessing the desirable qualities heretofore specified.

It is a matter of some importance, from a practical standpoint, that the liquid outlets in the bottom of the coffee container shall be regulated with reference to the feed of water from the water container in such manner that the extract emerging from the coffee container shall not escape too fast so as not to get the full benefit of the extraction nor too slowly to produce the desired extraction.

Experience teaches that difficulty is encountered in the uniform or steady percolation of water through the mass of ground coffee present in the coffee container, it being a demonstrable fact that the air confined within the mass of ground coffee tends to oppose the free and unimpeded percolation of the water.

In a practical form of the apparatus, vents in vertical series are provided in the wall of the coffee container, at four or more sides thereof, all the vents being grouped as closely as desired and all the vents being below the top surface of the mass of coffee, said vents performing the function as a relief to the free exit of the air from the mass of coffee when the water percolates therein and the mass swells or expands by absorption of moisture and becomes compacted and dense within the container.

In addition to the vent apertures provided in vertical series and below the coffee level within the container I provide other apertures of somewhat lesser diameter in the wall of said coffee container, said other apertures being positioned at or about the level of the coffee mass and said additional apertures providing for the outflow of free water which lodges upon the surface of the coffee mass toward the end of the percolation period, the free liquid being precluded by the expansion and condensation of the coffee mass from percolating the interior of said mass, and said free water at the surface tending to escape from the coffee container through the outlet apertures at the coffee level therein.

With the conditions of grind and of air relief properly proportioned, the downflow of water from the water container is so regulated that under normal conditions there is no accumulation of free water at the surface of the coffee mass. Should the filtration be retarded, due to too fine a grind or for other causes, the tendency of the water admitted to the coffee container is to back up and accumulate at the surface of the mass, in which event the apertures at the surface of the mass allow the free escape of water which would otherwise remain upon the surface of the mass.

A further feature of novelty in the apparatus disclosed herein is the organization of the outlets from the water container, the area of which is proportionate to the rate of flow into the coffee container.

To prevent the water from "burrowing" into the coffee mass, which burrowing is occasioned by the force of a direct flow under the head of water in the water container, it is desirable not only to distribute the water over the surface of the coffee but to break up the streams of water in order to obtain a spray effect of the water upon the coffee mass.

To this end, the bottom of the water container is constructed in a novel manner with a view to producing a plurality of cup shaped depressions, each having an aperture the axis of which is at an angle to the vertical axis of the container. Said apertures in the series of cup shaped depressions are at different angles to each other with a view to directing the sprays of down flowing water in several directions so as to attain a desired distribution of water over the surface of the coffee mass.

The utility of the cup shaped depressions is to reduce at the outlet the head of the water present in the container, as a result of which the water instead of flowing in continuous streams is broken up and passes in the form of sprays into the coffee, such sprays being distributed to all intents and purposes over the top surface of the coffee mass.

A peculiarity in the action of the sprays is that the water under the full head within the container is forced toward the outer margin of the coffee mass next to the wall of the coffee container whereas a reduction in the head of water within the water container is attended by a diminution in the force of the sprays so that the sprays gradually discharge toward the intermediate and middle portions of the coffee mass, insuring the desirable distribution in the water sprays over practically the whole top surface of the coffee mass.

In the drawings,

Figure 1 is a vertical section of my domestic coffee brewing mechanism in operative relation to any ordinary pot.

Fig. 2 is a plan view of the water container detached from the coffee pot and from the coffee container, the arrows showing the direction of flow of the water sprays.

Fig. 3 is a vertical sectional view, on an enlarged scale, of the bottom portion of the water container, the arrows indicating the diversity in the direction of flow of the water sprays.

Fig. 4 is a side elevation, on an enlarged scale, of a portion of the coffee container illustrating one vertical series of relief apertures and one horizontal series of water exit apertures, provided in the wall of said coffee container.

As shown, A is the water container and B is the coffee container assembled in cooperative relation to each other, and the two containers A B being adapted to a suitable pot C to which the brew is delivered and within which it is stored for use. The coffee container B is tapering and provided at its upper margin with a flange $b$, the latter forming a shoulder $b'$ both externally and internally of said container. The external shoulder rests upon the top edge of the pot for suspending the container B therein, the upper margin of said container B flaring upwardly from the internal shoulder so that the lower portion of the conical water container A may have a wedging fit within the vessel B, see Fig. 1.

Each vessel A and B is composed of imperforate metal, or other appropriate material, but as shown the bottom D of the coffee container is composed of wire gauze or other foraminous material, the mesh of which is of appropriate size for retaining the ground berry while permitting the free outlet of the brew.

Essential features of the coffee container are, first, a plurality of vertical series of relief apertures E in the imperforate wall of the coffee container, and, second, a plurality of series of liquid exit apertures F in said wall of the container B, the apertures F being at or about the level of the surface of the ground mass within the coffee container.

There are three, four or more series of vertical apertures E provided in the wall of the container B, each series of apertures extending from the lower margin of the container and terminating at or about the level of the ground mass. Each series of apertures E may consist of five openings, more or less, the diameter of which is such that the air confined within the mass of ground coffee is free to escape from such mass and through the apertures when the coffee mass, owing to the absorption of moisture or saturation by the water, swells and expands to an appreciable extent so as to become compacted within the container B to such an extent that the confined air would otherwise preclude the desired percolation of water through the mass of coffee.

The exit apertures F are in series at or about the level of the mass of ground coffee, one series of such apertures F crossing each vertical series of apertures E, so that the line of apertures F is about at a right angle to the line of the vertical series of apertures E. Three, four or more of the horizontal series of apertures F are used around the container B, each horizontal series F crossing one vertical series E, and in a practical form, the apertures F are smaller in diameter than the apertures E, as a result of which the outflow of water from the coffee container is precluded under normal conditions by way of the apertures F; but when the water backs up, due to the expansion and consequent resistance of the coffee mass, so that the water has a tendency to accumulate on the surface of said coffee mass, then the apertures F provide an outlet for the escape of the free water which otherwise would be retained for an undesirable period within the container B and upon the swollen and expanded mass of the ground coffee.

Water container A is provided with a bottom G integral with the tapering wall of said container, said bottom G being provided with a plurality of cup shaped depressions or pockets H. Any desired number of depressions are used, four or more as may be required, although six are shown in Fig. 2.

The pockets are usually formed by depressing the metal of the bottom G, said pockets being of equal depth and forming depending lugs by which the container A may rest upon a table without canting or tilting. The depressions are arranged as depicted in Fig. 2, four of them in a circle and two near the middle, but the particular arrangement is not essential. Each depression is provided with a liquid outlet $h$, the imaginary axis of which is at an angle to the vertical axis of the container, and the axis of said outlets $h$ being at different angles the effect of which is to direct the liquid sprays from the outer pockets in the series toward the walls of the container whereas the liquid sprays from the two middle pockets are directed in crossing relation and also toward the boundary wall of the container, all as indicated by the arrows in Figs. 1, 2 and 3.

With the proper quantity of water in the container, the head or pressure tends to force the water through outlets $h$ on diverging lines, but the presence of the pockets around the outlets together with the angularity of the outlets have the effect of so limiting the pressure as to discharge the liquid in the form of a spray from each outlet in contradistinction to a continuous stream. The aggregate area of the outlets in the bottom of the water container controls the quantity of water flowing in a given period of time upon the coffee mass, but this flow of water is checked and retarded to an appreciable extent for the specific purpose of attaining in the aggregate a relatively slow feed of water to the coffee mass. This is important in my mode of brewing coffee for several reasons, but while the water feed is in the aggregate relatively slow it is to be noted that at the beginning of the operation and with a full head of water in the container A, the volume of water sprayed upon the coffee is greater in a given period of time than the volume fed at a later period to the coffee mass, the effect of which is to saturate the mass of coffee quickly and obtain a quick extraction of the essential oils, the resulting brew flowing into the pot, whereas upon a reduction in the head of water in container A there is a slower feed of water in the later stages of the brewing operation, such reduction slowing up the force of the sprays so that the sprays drip upon the coffee mass over the middle region of the top surface thereof. The sprays are thus distributed over the top surface of the coffee due to the angularity of the outlets $h$ and the reduction gradually in the head of water in the container, and by this procedure the water is precluded from burrowing on definite restricted lines into the mass of the coffee, such distribution attaining a desirable extraction from the coffee of practically all the essential oils thereof, as well as the tannin, the extraction of which is slower and is obtained by the thorough saturation of the coffee and the percolation of water into all parts of the mass, the brew in the later stages flowing into the pot and the brew obtained at the earlier, later and intermediate stages commingling and producing a palatable balanced beverage.

Having thus fully described the invention, what I claim as new and desire to secure by Letters Patent is:

1. In a device for brewing coffee, the combination with a water container, of a coffee container the boundary wall of which is provided with a plurality of vertical series of air relief apertures each series extending from the lower portion of said container to a point intermediate the ends of the container for the upper aperture of the series to be in the plane substantially of the level of the coffee mass adapted to be contained within said container, each series of such vertical air relief apertures being separated from other apertures by a portion of the imperforate boundary wall of said container.

2. In a device for brewing coffee, the combination with a water container, of a coffee container the boundary wall of which is provided with a plurality of horizontal series of exit apertures positioned intermediate the ends of said container and in a plane substantially at the level of the coffee mass adapted to be deposited within said container, the apertures of each horizontal series being of a restricted area for precluding the outflow of water except upon the accumulation of a certain quantity of water upon the top surface of the mass of coffee.

3. In a device for brewing coffee, the combination with a water container, of a coffee container the boundary wall of which is provided with a plurality of series of vertical relief apertures each series extending from the lower margin of the container to a point intermediate the ends of the container for the upper aperture of the series to be in a plane substantially at the level of the coffee mass adapted to be deposited in said container, and said container being provided also with a horizontal series of liquid outlet apertures positioned substantially in the plane of the upper apertures in the vertical series of relief apertures.

4. In a device for brewing coffee, the combination with a water container, of a coffee container the boundary wall of which is provided with a plurality of series of vertical relief apertures extending from the lower margin of the container to a point intermediate the ends of the container for the upper apertures of the series to be in a plane substantially at the level of the coffee mass adapted to be deposited in said container, and said container being provided also with a horizontal series of liquid outlet apertures positioned substantially in the plane of the upper apertures in the series of relief apertures, each horizontal series of outlet apertures crossing the plane of one vertical series of relief apertures.

5. In a device for brewing coffee, the combination with a water container, of a coffee container the boundary wall of which is provided with a plurality of series of vertical relief apertures extending from the lower margin of the container to a point intermediate the ends of said container for the upper apertures of the series to be in a plane substantially at the level of the coffee mass adapted to be deposited in said container, and said container being provided also with a horizontal series of liquid outlet apertures positioned substantially in the plane of the upper apertures in the series of relief apertures, the area of the apertures in the horizontal series being less than the area of the apertures in the corresponding vertical series.

6. In a device for brewing coffee, the combination with a coffee container, of a water container the bottom of which is provided with a plurality of cup-shaped depressions each having a spray producing aperture.

7. In a device for brewing coffee, the combination with a coffee container, of a water container the bottom of which is provided with a plurality of pocketed depressions each of which is provided with an outlet the axis of which is at an angle to the vertical axis of the container.

8. In a device for brewing coffee, the combination with a coffee container, of a water container the bottom of which is provided with a plurality of pocketed depressions each of which depressions is provided with an outlet, the axes of said outlets being at different angles to the vertical axis of said container.

9. In a device for brewing coffee, the combination with a coffee container, of a water container the bottom of which is provided with a plurality of pocketed depressions each of which depressions is provided with an outlet, the area of the individual outlets being restricted to insure a relatively slow feed of the liquid and the axes of said outlets being at different angles to the vertical axis of said container.

10. In the art of brewing coffee, the process which consists in controlling the flow of liquid to a mass of coffee in a restricted volume and at slow speed for effecting an initial quick extraction of the essential oils from the mass, and retarding the flow of liquid at a subsequent period in the brew to attain a prolonged extraction of the tannin and other elements of slow extraction, and combining the liquids obtained during the initial and subsequent stages of the brew for attaining a balanced liquid extract.

11. In the art of brewing coffee and similar extracts, the process which consists in spraying water in a restricted volume and at relatively slow speed to a mass of pulverulent material for producing a quick extraction of the essential oils from such mass, retarding the flow of the water during subsequent stages of the brew and distributing the water at reduced pressure over that area of the mass which remains substantially inert during the initial extraction, and combining the liquid extracts obtained at the initial and subsequent stages of the brew to produce a balanced beverage.

12. In the art of brewing coffee, the improvement which consists in spraying water upon a mass of ground coffee confined within a container so as to expand and compact such coffee within the container, and discharging from the interior of such mass the atmospheric air present therein, whereby percolation of water into the mass is not retarded by confined air within the mass.

In testimony whereof, I have signed my name hereto this 20th day of December, 1920.

BENJAMIN H. CALKIN.